May 22, 1951 I. L. NEWTON 2,554,051
X-RAY APPARATUS
Filed Feb. 10, 1949 3 Sheets-Sheet 2
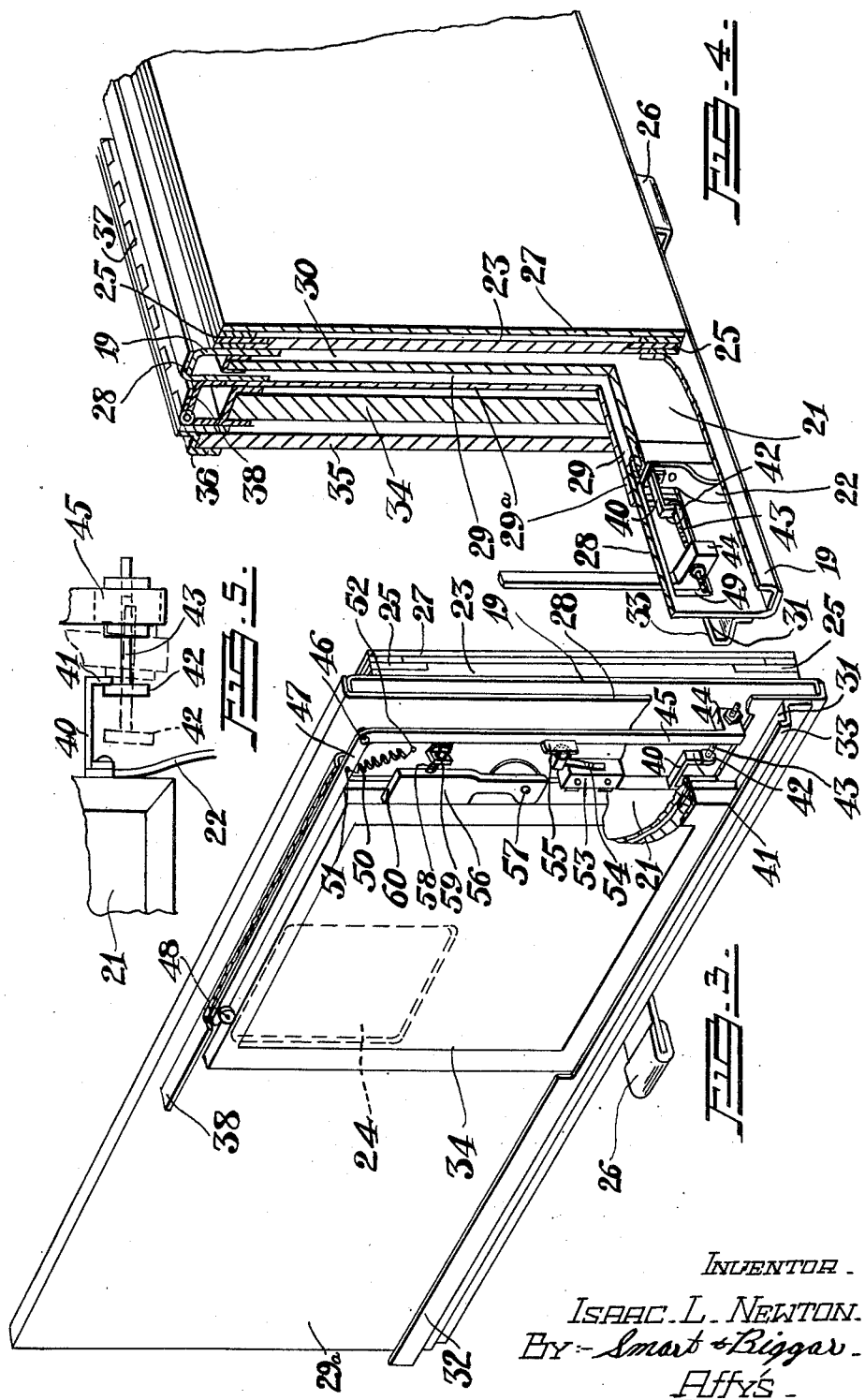
INVENTOR
ISAAC L. NEWTON
BY Smart & Biggar
Attys May 22, 1951 I. L. NEWTON 2,554,051
X-RAY APPARATUS
Filed Feb. 10, 1949 3 Sheets-Sheet 3
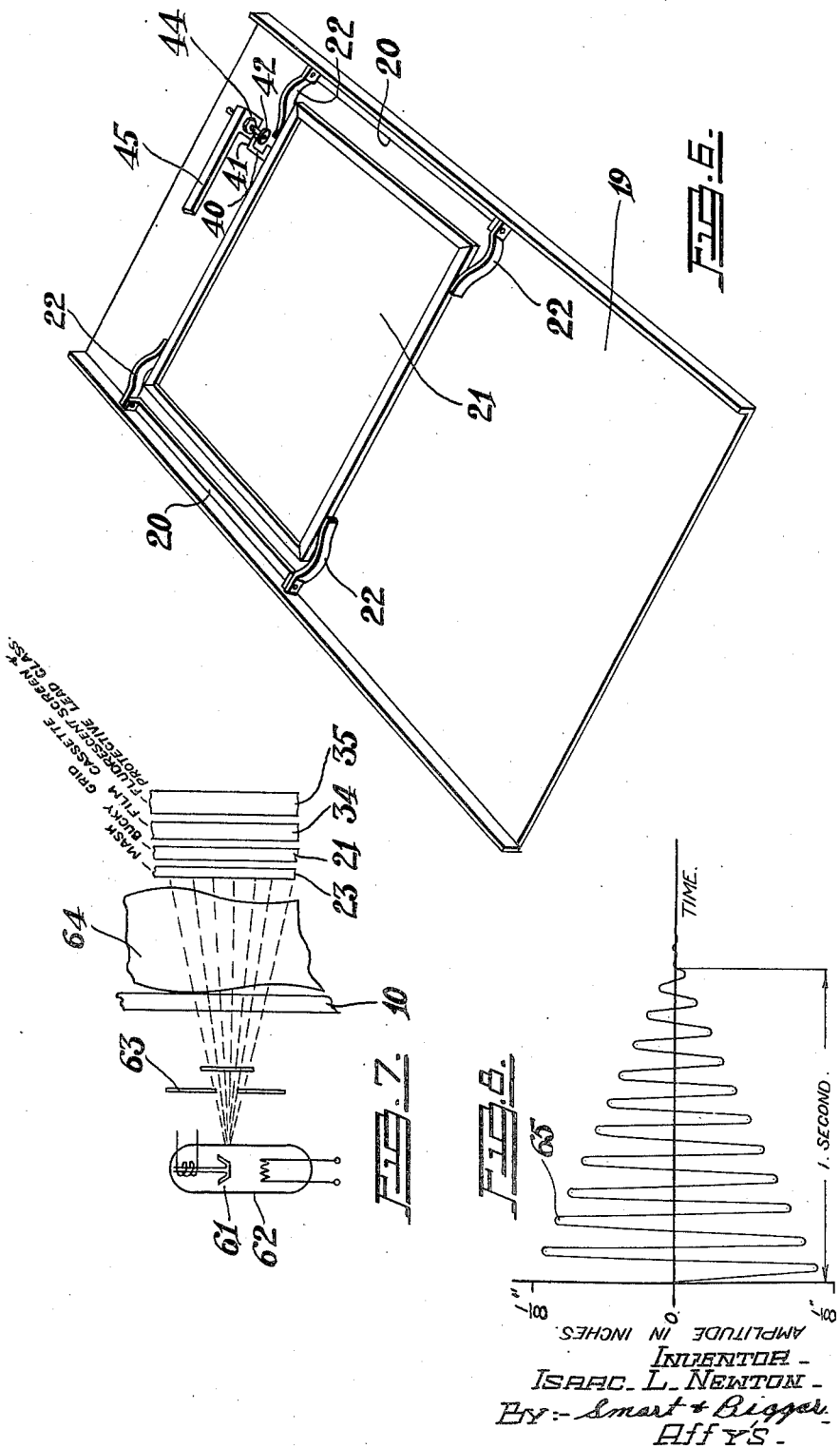
INVENTOR -
ISAAC L. NEWTON -
By:- Smart + Biggar
ATT'YS -

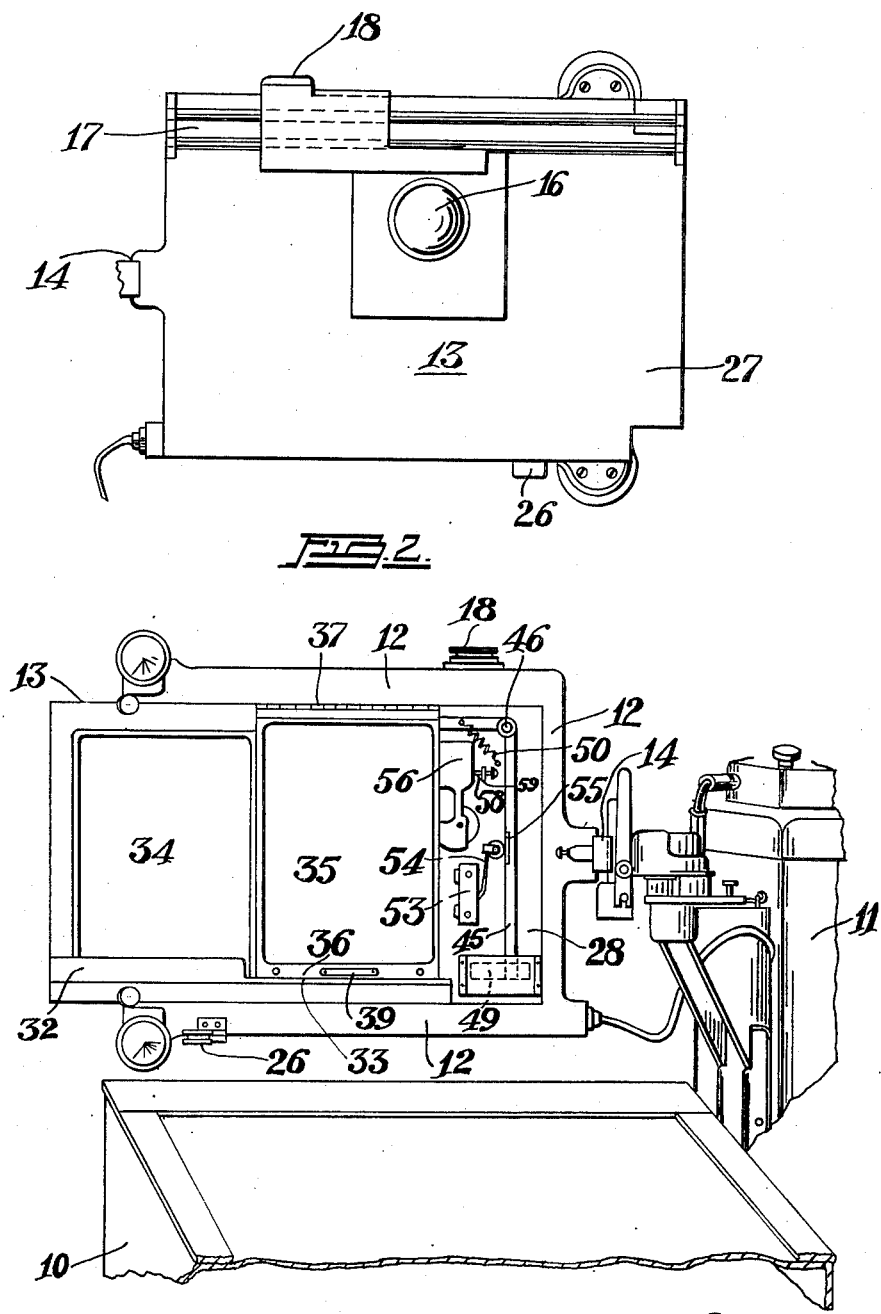

Patented May 22, 1951

2,554,051

UNITED STATES PATENT OFFICE 2,554,051

X-RAY APPARATUS

Isaac L. Newton, Ottawa, Ontario, Canada, assignor to The Honorary Advisory Council for Scientific and Industrial Research, Ottawa, Ontario, Canada, a corporation of Canada Application February 10, 1949, Serial No. 75,650

2 Claims. (Cl. 250—62)

The invention relates to X-ray apparatus and is concerned with apparatus for preventing scattered X-rays from affecting images formed by X-rays on photographic film.

Scattered X-rays are X-rays reaching the film from directions other than the direction of the source of primary X-rays in the X-ray tube and, in most cases, scattered X-rays are due to the primary X-rays causing secondary radiation in random directions from within the object being photographed. The object is placed between the source of primary X-rays and the film so that the photographic image of the object formed on the film by the X-rays has the nature of a shadow. If scattered X-rays are among the primary X-rays reaching the film, the image will appear foggy or indistinct with its outline indefinite and, in some cases, inaccurate.

Scattered X-rays can be prevented to a substantial extent from reaching the film by filtering the X-rays through a Bucky grid placed between the object and the film. A Bucky grid consists of alternate strips of X-ray opaque and X-ray permeable material arranged side by side in planes substantially perpendicular to the plane of the film. Primary X-rays coming in a direct line from their source in the X-ray tube can pass freely to the film through the strips of X-ray permeable material, but scattered X-rays reaching the Bucky grid from all directions pass obliquely through the X-ray permeable material to the X-ray opaque strips which absorb them before they can affect the film.

A disadvantage in using a Bucky grid is that the X-ray opaque strips cast a shadow on the film and, in the case of the Bucky grid being stationary during the exposure of the film, an image of the opaque strips in the Bucky grid will be superimposed on the image of the object. To avoid the superimposed image of the opaque strips, it has been proposed to move the Bucky grid during the exposure so that every part of the film will receive an equal length of direct exposure to the object.

Prior to the invention, the two modes of movement of the Bucky grid in common use were continuous movement in one direction during the exposure, and oscillation at constant amplitude. Continuous movement in one direction requires apparatus capable of sensitive adjustment of the speed of movement in relation to the length of the exposure so that whether, for example, the exposure period is ½ a second or 10 seconds, the movement of the Bucky grid is at a velocity suited to the length of the period and is constant during the period. In the case of oscillation at constant amplitude, the velocity of the Bucky grid is at a low value approaching zero twice during each oscillation while its direction of movement is being reversed, and this causes an image of the X-ray opaque strips in the Bucky grid to be formed on the film by the accumulative effect of the low velocity intervals which, due to the oscillation being at constant amplitude, occur repeatedly while the Bucky grid is over the same location on the film. To overcome this disadvantage, it has been proposed to use synchronizing apparatus which would synchronize the oscillations of the grid with the frequency of direct current voltage pulses applied to the X-ray tube to produce the primary X-rays. In this way, the low velocity intervals during which reversals of movement of the Bucky grid occurred were at times when the voltage applied to the X-ray tube was too low to produce effective X-rays and therefore the film was not affected.

The apparatus for these prior art proposals was expensive, critical in adjustment, and required a large proportion of the space available near the film. A more serious disadvantage, however, was that in the case of exposures made for medical diagnosis, the known apparatus was adapted to be used only in the under-table technique in which the film and Bucky grid are placed under the table on which the patient rests, and the X-ray tube is suspended above the patient. With this arrangement there may be sufficient room under the table to house the prior art types of apparatus for moving the Bucky grid but, in most instances, it is desirable to observe the area to be photographed on a fluorescent screen held in a turret attached to the X-ray machine to determine the exact location and the right time at which to make the exposure. This is particularly true when photographing the gastro-intestinal tract since the patient must take a drink containing an X-ray opaque substance such as barium sulphate and the exposure to be useful must be made while the barium sulphate is in the area to be photographed. The tract is continually turbulent causing considerable movement of the barium sulphate along the tract and, while adjusting the table from the approximately vertical position in which the fluoroscopic examination is made to a horizontal position to make an X-ray exposure of the under-table film, the barium sulphate may move along the tract to such an extent that the desired detail of the tract will not be exposed to the film. This will not be apparent until the film is developed, and it will then be necessary to make another photograph. An alternative to adjustment of the table is to swing the turret of the X-ray machine away from the patient and, without changing the position of the patient, to bring the X-ray tube into what is judged to be the correct position in front of the patient. This alternative method has the same disadvantages as the table adjustment method.

These disadvantages of the under-table technique often caused the operator to use the above-table technique in which the film can be exposed with the patient in the same position as for the fluoroscopic examination, and the exposure can be made at any desired instant without adjustment of the table or the turret of the X-ray machine. The above-table technique is also known as the spot film technique since the operator by viewing the area to be photographed on the fluorescent screen can "spot" or locate a particular portion of the film over the area. The X-ray tube used in the above-table technique is the one used for fluoroscopic examination and is located beneath the table. The film is housed in a light tight cassette and is slid behind the fluorescent screen for exposure at the correct instant as indicated by the image being observed on the fluorescent screen. Prior to the invention, an above-table exposure of the film was made without use of a Bucky grid, or with a stationary Bucky grid, since known apparatus for moving a Bucky grid could not be conveniently mounted behind the fluorescent screen and the film cassette in the X-ray machine's turret which, to be adapted to quick adjustment, must not be heavily loaded or have its size increased.

It is an important object of the invention to provide, for use with X-ray photographic devices of the type in which a Bucky grid is positioned between X-ray sensitive photographic film and an X-ray emitting device during exposure of the film, apparatus comprising a frame supporting the grid for movement in a direction transverse to the length of the strips, and means carried by the frame for vibrating the grid in said direction through a plurality of cycles in a wave motion of substantially damped character during exposure of the film.

Other objects of the invention reside in the provision of resilient means for accomplishing said damped vibration, and in certain details of the mounting for the grid which will be more apparent after a study of the specification.

Another important object of the invention is the provision of new method steps in X-ray photography by the use of a Bucky grid, including the steps of setting the Bucky grid into vibration in a direction transverse to the length of the strips making up the grid and through a plurality of cycles, and permitting said vibration to decrease gradually and continuously in amplitude while exposing film to X-rays passing through said grid.

According to the invention, the disadvantages of the prior art are overcome and apparatus in which a Bucky grid may be moved in an advantageous manner during an above-table exposure is provided by resilient means suspending the Bucky grid so that, after being tensioned and released, the resilient means can vibrate the Bucky grid in a wave motion which is substantially damped and of a frequency great enough that a plurality of cycles will be completed during the time required to form a photographic image on the film.

Preferably the resilient means comprises a plurality of leaf springs, and the means for tensioning and releasably holding the Bucky grid so that the resilient means is under tension preferably comprises a lever which is operated by the film cassette as it is slid into position for exposure of the film referred to below as the film position. The releasable holding means may be adapted to release the Bucky grid as the cassette is slid into the film position and to resume its hold on the Bucky grid as the cassette is slid from the film position. It is also preferred that the intensity of the X-rays be controlled by means operated by the holding means in a manner such that a low intensity is available for fluoroscopic examination and a high intensity is available for exposure of the film.

The damping of the wave motion of the Bucky grid, as provided by apparatus according to the invention, causes each reversal of motion of the Bucky grid to occur at a location removed laterally of the film from the location of either the immediately preceding or succeeding reversal of motion in the same direction. In this manner the effect of the low velocity of the Bucky grid which precedes and follows each reversal of motion of the Bucky grid is prevented from accumulating on the film in the form of an image of the X-ray opaque material in the Bucky grid. The apparatus for imparting the damped wave motion to the Bucky grid when used in the turret of an X-ray machine does not substantially increase either the weight or size of the turret, and so is suited to the above-table method to which previous apparatus was not suited.

The invention will be further described by reference to the accompanying drawings in which certain embodiments of it are shown and in which Figure 1 is a perspective view of part of an X-ray machine having viewing and spot film apparatus according to the invention mounted in its turret, Figure 2 is a rear view of the viewing and spot film apparatus shown in Figure 1, Figure 3 is a front perspective view, partly in section, of the viewing and spot film apparatus with its fluorescent screen removed, Figure 4 is a rear perspective view, partly in section, of the apparatus shown in Figure 3 with the fluorescent screen in place, Figure 5 is a detailed view of part of the releasable holding means, Figure 6 is a perspective view of a Bucky grid suspended according to the invention, Figure 7 is a diagrammatic view of apparatus for forming an image of an object by X-rays, and Figure 8 is a graph showing an example of damped wave motion of a Bucky grid moved by apparatus according to the invention.

Referring to the drawings, there is shown in Figure 1 an X-ray machine consisting of a table 10 on which the patient is placed, a standard 11 which supports a turret 12 in which the viewing and spot film apparatus 13 is mounted. The turret 12 is mounted to the standard 11 by a swivel arrangement 14, and the turret 12 may be moved vertically along the standard 11. The table 10 may be tipped into a vertical position, and may be moved horizontally. At the back of the viewing and spot film apparatus 13 is mounted a pressure cone 16 which is slidable along a trackway 17 by a handle 18. The pressure cone 16 is in a position to be placed against the patient's body when the viewing and spot film apparatus 13 is in use.

As shown in detail in Figures 3 and 4, the viewing and spot film apparatus comprises a steel frame 19 having supports 20 (Figure 6) to which a Bucky grid 21 is mounted by a leaf spring 22 at each of the corners of the Bucky grid 21 as shown in Figure 6. The springs 22 extend longitudinally in the same general direction as that of the longitudinal directions of the X-ray opaque strips in the Bucky grid 21. A mask 23 (Figure 4) consisting of a steel reinforced lead plate is mounted against the side of the frame 19 away from the Bucky grid 21 and has an opening 24 (Figure 3) corresponding in size to one-quarter of the maximum area of film that can be exposed. The mask 23 is slidable along trackways 25 which are mounted on the frame 19. A handle 26 is attached to the mask 23 and extends to the front of the viewing and spot film apparatus 13, as shown in Figures 1, 2, 3 and 4. The mask 23 is covered by a Bakelite plate 27 which extends over the back of the viewing and spot film apparatus 13. A steel frame member 28 fits against the frame 19 so that space is left between the frame member 28 and the frame 19 for the Bucky grid 21 as shown in Figure 4. The frame member 28 has an opening 29 corresponding in size to that of the maximum area of film that can be exposed, and there is a Bakelite plate 29a against the frame member 28 covering the opening 29. Another opening 30 of the same size as opening 29 is in the frame 19 and is aligned with the opening 29. The frame member 28 supports a trackway 31 having a high flange 32 extending to an edge of the opening 29, and a low flange 33 extending across the bottom of the opening 29. The trackway 31 is of a width so suited to that of a film cassette 34 that the cassette 34 can be inserted with its lower edge between the high flange 32 and the frame member 28 as shown in Figure 1, and can then be slid along the trackway 31 until the lower edge of the cassette 34 is supported by the low flange 33 as shown in Figure 3. A fluorescent screen 35 covered by protective lead glass is mounted in a frame 36 which is attached by a hinge 37 to a bracket 38 extending above the opening 29 in the frame member 28. The fluorescent screen 35 may be swung clear of the opening 29 on its hinges 37, and it has a handle 39 (Figure 1) for this purpose.

A bracket 40 mounted on an edge of the Bucky grid 21 has an arm 41 adapted to be engaged by a catch 42 mounted by an arm 43 threaded into a lateral projection 44 of a lever arm 45 of a lever pivoted to the frame member 28 by a pivot 46. The other lever arm 47 of the lever extends along the upper edge of the opening 29 in the frame member 28 so that a roller 48 pivoted to its end is against the upper edge of the cassette 34 when the cassette is in the film position as shown in Figure 3. With the cassette 34 in the film position, the film is directly in front of the openings 29 and 30, and is in the position in which it may be exposed to X-rays.

As shown in Figures 1 and 4, the projection 44 on the lever arm 45 extends through an opening 49 in the frame member 28. The lever arm 47 is urged downwardly by a spring 50 (Figures 1 and 3) attached at one end to the lever arm 47 through a hole 51 and at the other end it is anchored to the frame member 28 at the point 52. The spring 50 acting on the lever arm 47 causes the lever arm 45 to be urged away from the Bucky grid 21 and, when the cassette 34 is not in the film position, the catch 42 holds the arm 41 causing the springs 22 to be under tension. Upon the cassette 34 being slid into the film position, the roller 48 engages the top of the cassette 34 and the catch 42, which holds the Bucky grid 21 by the arm 41 in a position such that the springs 22 are under tension, is moved inwardly releasing the Bucky grid 21.

As shown in Figure 3, there is a sensitive snap switch 53 mounted to the frame member 28 with its operating lever 54 adapted to be operated by a projection 55 on the lever arm 45.

When the cassette 34 is slid into the film position (Figures 1 and 3), it is stopped by a stop 56 pivoted to the frame member 28 by a pivot 57 and movable to either an upright position as shown or to a horizontal position. The position of the stop 56 when upright may be adjusted by a screw 58 which is threaded through a projection 59 on the frame member 28, and when the stop 56 is in this position the film cassette 34 is stopped when aligned with the openings 29 and 30. When the stop 56 is pivoted into a horizontal position, the film cassette 34 is stopped against the end 60 of the stop 56 and, with the film cassette 34 in this position only one-half of the film is exposed to the openings 29 and 30.

The operation of the X-ray machine is diagrammatically illustrated in Figure 7 in which X-rays (shown by broken line) from the rotating anode 61 of an X-ray tube 62 are passed by an aperture structure 63 in lead of well known construction toward a patient 64 on the X-ray table 10. As shown in the figure the mask 23 is next the patient and successively behind the mask 23 are the Bucky grid 21, the film cassette 34 and the fluorescent screen 35. A covering of protective lead glass over the fluorescent screen 35 protects an observer of the screen 35 from the X-rays. When the cassette 34 is not in the film position an image of the area being X-rayed in the patient 64 is visible upon the fluorescent screen 35 and when the cassette 34 is slid into the film position the film is exposed to the X-rays and a photographic image is obtained. The switch 53 operates control circuits for the X-ray tube 62 so that, with the film cassette 34 removed from the film position, the tube 62 operates at low power with the anode 61 stationary and, with the film cassette 34 in the film position, the tube 62 operates at high power with the anode 61 rotating.

The procedure followed by the operator to obtain an X-ray photograph using the apparatus according to the invention will now be described. With the film cassette 34 loosely supported behind the high flange 32 of the trackway 31, the operator may view the image of the area of the patient 64 being X-rayed on the fluorescent screen 35, and during this operation the anode 61 of the X-ray tube 62 is stationary and low intensity X-rays are being produced. The cassette 34 being removed from the film position, the spring 50 urges the lever arm 45 of the releasable holding means away from the Bucky grid 21 so that the catch 42 engages the arm 41 and pulls the Bucky grid 21 aside causing tension in the leaf springs 22. If the photograph is to the full size of the film in the cassette 34, the mask 23 is slid by its handle 26 completely from in front of the openings 29 and 30, but if the photograph is desired to be one-quarter of the size of the film so that four separate exposures may be taken, the mask 23 is left in the position in which it is shown in Figure 3. To take the first of four photographs on the film in the cassette 34, the stop 56 is swung to its horizontal position and the first photograph is taken with the edge of the film cassette abutting the end 60 of the stop 56. The next photograph is taken with the stop 56 in its upright position, and for the remaining two photographs the procedure described for the first two is repeated with the film cassette 34 rotated through 180° in its own plane.

The operator may adjust the area to be photographed so that it is properly shown on the fluorescent screen by manipulation of the pressure cone 16 which is forced against the patient 64 and may be moved laterally by the handle 18. With a proper image being shown on the fluorescent screen 35, the operator quickly slides the film cassette 34 along the trackway 31 behind the fluorescent screen 35 until the cassette 34 engages the stop 56. As the film cassette 34 is slid into the film position it engages the roller 48 forcing the lever arm 47 upwardly against the tension of spring 50, causing the lever arm 45 to move the catch 42 inwardly freeing the arm 41 and allowing the leaf springs to vibrate the Bucky grid 21 in a damped wave motion. The degree of damping of the wave motion is determined according to the types of exposures the apparatus is to take, and it depends on the relation between the weight of the Bucky grid 21 and the degree of resilience in the leaf springs 22.

As the lever arm 45 moves inwardly due to the action of the film cassette 34 on the roller 48, the projection 55 engages the arm 54 of the switch 53 operating the switch to control the X-ray tube 62 as described above. The exposure is terminated by a timer of well known design which may be built into the X-ray machine by the manufacturer.

During the exposure, the Bucky grid 21 vibrates in a damped wave motion, an example of which is diagrammatically illustrated in Figure 8. In this figure the line 65 is a graph of the motion of the Bucky grid 21 drawn against an ordinate representing amplitude and an abscissa representing time. As shown by the line 65 the first oscillation of the grid has an amplitude of approximately one-eighth inch and each successive oscillation progressively decreases in amplitude until at the end of one second the amplitude is nearly zero. Such a motion of the Bucky grid 21 would be suitable for exposures of say one-quarter of a second to three-quarters of a second. The Bucky grid 21 may be given a damped wave motion suitable for other lengths of exposure by varying the amount of resilience applied by the springs 22 to the Bucky grid 21.

When the exposure has been completed, the film cassette 34 is slid from the film position along the trackway 31 and may be removed from the apparatus so that the film may be developed. As the film cassette 34 is slid from the film position the roller 48 is freed and the spring 50 is then able to pivot the lever arm 45 so that the catch 42 again engages the arm 41 pulling the Bucky grid 21 aside to tension the springs 22. In this way the Bucky grid 21 is automatically reset for a further film exposure.

I claim:

1. Apparatus for use with X-ray photographic devices of the type in which a Bucky grid having a plurality of spaced strips of X-ray opaque material is positioned between X-ray sensitive photographic film and a X-ray emitting device during exposure of the film, said apparatus comprising a frame arranged to be mounted above an X-ray table for rotation about a substantially horizontal axis parallel to the plane of said grid, said frame being arranged to support said grid for reciprocatory movement in a direction transverse to the length of said strips, a plurality of leaf springs each having one end attached to said frame and with their other ends engaging said grid to urge said grid toward a normal position of rest located intermediate between the extremes of said reciprocatory movement, said leaf springs extending in a direction substantially parallel with the plane of said grid and substantially at right angles to the direction of said axis of rotation of said frame, and releasable holding means for retaining said grid at one extreme of said movement with at least one of said leaf springs under tension, whereby upon release of said releaseable holding means and during exposure of the film, said leaf springs vibrate said grid in said direction through a plurality of cycles in a wave motion of substantially damped character.

2. Apparatus as defined in claim 1 and including a film holder, means on said frame for receiving said film holder and providing movement of said film holder to an exposing position in a plane substantially parallel to that of the Bucky grid, and means operable by such movement of said film holder to release said releaseable holding means and set up said wave motion of the Bucky grid.

ISAAC L. NEWTON.

REFERENCES CITED

The following references are of record in the file of this patent:

UNITED STATES PATENTS

| Number | Name | Date |
|---|---|---|
| 1,164,987 | Bucky | Dec. 21, 1915 |
| 1,651,707 | Irwig | Dec. 6, 1927 |
| 2,174,738 | Eddy | Oct. 3, 1939 |
| 2,204,347 | Files | June 11, 1940 |
| 2,468,963 | Dudley | May 3, 1949 |

FOREIGN PATENTS

| Number | Country | Date |
|---|---|---|
| 637,579 | Germany | Jan. 28, 1937 |
| 856,752 | France | Aug. 7, 1940 |